June 22, 1948.  H. D. ELSE ET AL  2,443,654
ELECTRICAL CONNECTOR
Filed Sept. 20, 1944  2 Sheets-Sheet 1

WITNESSES:
C. J. Weller.
F. P. Lyle

INVENTORS
Harry D. Else and
Joseph E. Mulheim.
BY O. D. Buchanan
ATTORNEY

June 22, 1948.  H. D. ELSE ET AL  2,443,654
ELECTRICAL CONNECTOR
Filed Sept. 20, 1944  2 Sheets-Sheet 2
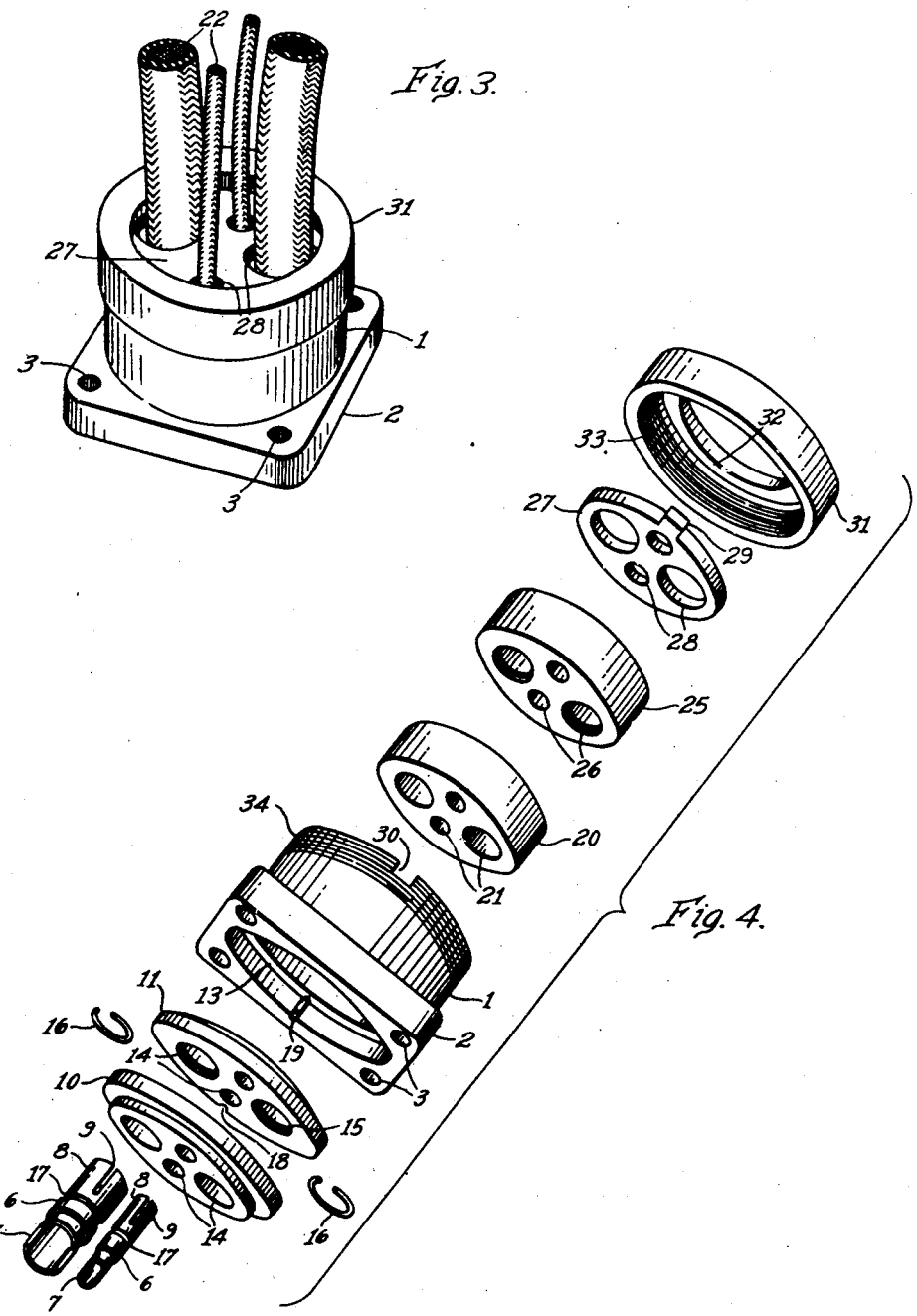
WITNESSES:
C. J. Weller.
F. P. Lyle
INVENTORS
Harry D. Else and
Joseph E. Mulheim.
BY O. B. Buchanan
ATTORNEY Patented June 22, 1948

2,443,654

UNITED STATES PATENT OFFICE 2,443,654

ELECTRICAL CONNECTOR

Harry D. Else and Joseph E. Mulheim, Lima, Ohio, assignors to Westinghouse Electric Corporation, East Pittsburgh, Pa., a corporation of Pennsylvania Application September 20, 1944, Serial No. 554,904

4 Claims. (Cl. 173—328)

The present invention relates to electrical connectors, and more particularly to a separable connector which is especially adapted for use on aircraft electrical equipment, and for handling heavy currents.

It is necessary to connect the external leads to electrical equipment used on aircraft in a manner which permits rapid and easy connection and disconnection, but which provides reliable electrical connection to the equipment and which is not disturbed by the severe vibration which may be encountered in service, and separable connectors of various types have been used for the purpose of making such connections. In the case of equipment of high electrical capacity, however, such as generators, in which heavy currents, of the order of 200 amperes or more, for example, have to be handled, the existing types of separable connectors have been found to be inadequate, and various types of stud connectors have been proposed. Stud-type connectors, however, are usually bulky and heavy, and are not capable of easy and rapid connection and disconnection of the leads, which is necessary, or at least highly desirable, for aircraft use.

The principal object of the present invention is to provide a separable connector which is compact and light in weight, but which is capable of handling heavy currents and of withstanding severe vibration.

Another object of the invention is to provide a separable connector which can be easily and rapidly connected and disconnected, and in which the engaging contact surfaces are positively held in contact under heavy pressure.

A further object of the invention is to provide a separable connector in which the leads are supported in such a manner that they cannot pull out and cannot be grounded by chafing of the insulation, and in which the pressure at the engaging contact surfaces is maintained even under severe conditions of vibration.

Other objects and advantages of the invention will be apparent from the following detailed description, taken in connection with the accompanying drawing, in which:

Fig. 3 is a perspective view of the complete connector; and

Fig. 4 is an exploded perspective view showing the parts of the device.

Figure 1:
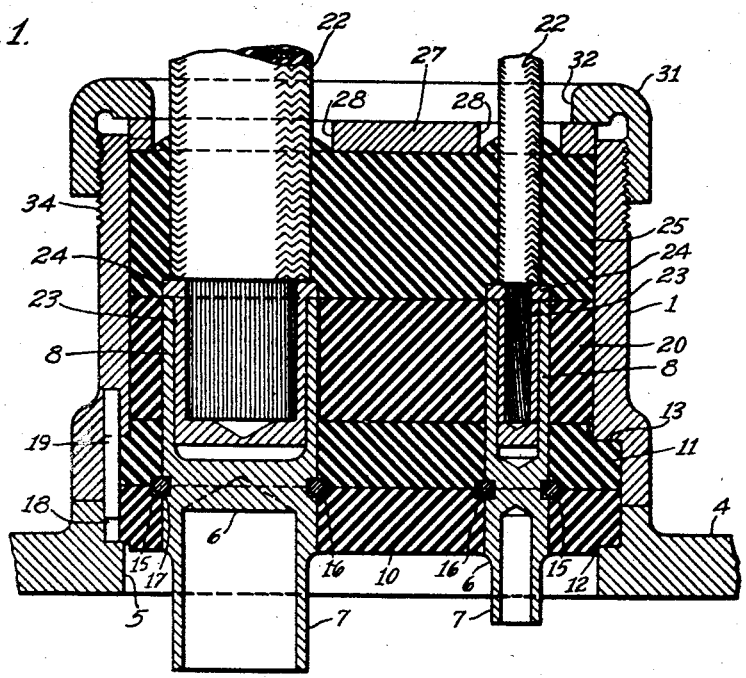
Figure 1 is a vertical developed sectional view of the assembled connector, approximately on the line I—I of Fig. 2.
Figure 2:
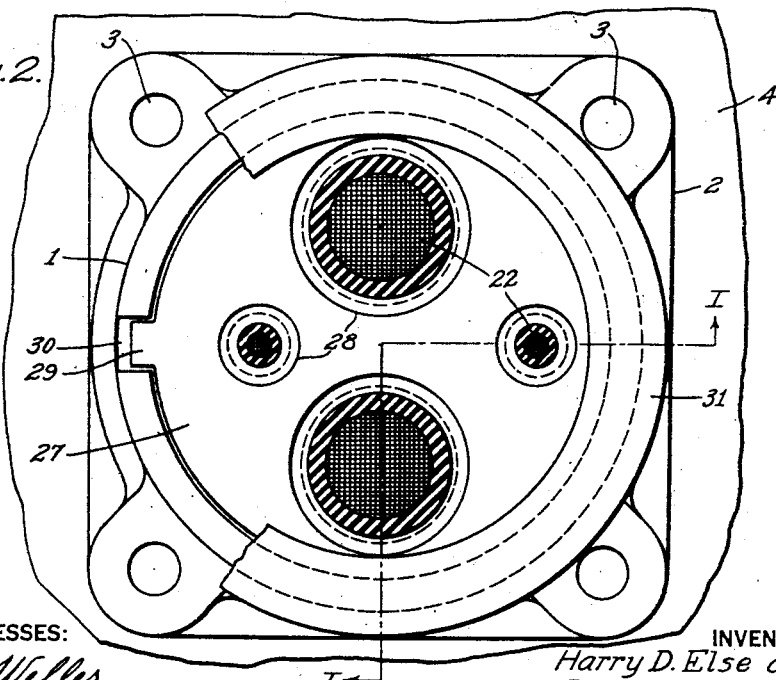
Fig. 2 is a top plan view of the connector, partly broken away.

As shown in the drawing, the connector of the present invention has a generally cylindrical metal housing member 1 having a square base 2, which is provided with holes 3 for the reception of mounting screws for securing the housing to the frame 4 of an aircraft generator, or other device on which the connector is to be used. Only a part of the frame 4 is shown since its construction forms no part of the invention, and it is to be taken as merely illustrative of a portion of any electrical device on which the connector is to be used. As shown, however, the housing 1 is secured to the frame 4 over an opening 5 in the frame through which the electrical leads of the device housed in the frame are to be connected to the external circuit.

The internal leads of the electrical device are intended to be connected to a plurality of terminal contacts 6 secured in the housing 1. In the particular embodiment of the invention shown in the drawing, there are four of these contact terminals, two large ones and two small ones, since the embodiment shown is intended for use on a direct-current aircraft generator, and provides connection for both the armature and field leads of the generator. It is to be understood, however, that any necessary number of terminal contacts 6 may be used, the number and relative sizes of the contacts being determined by the conditions of the particular application. Each of the terminals 6 has a lower hollow portion 7, which may be cut away at one side as clearly shown in Fig. 4, and in which the internal leads of the electrical device may be connected in any suitable manner, as by soldering or brazing. Each of the contact members 6 also has a hollow upper portion 8 for the reception of contacts attached to the external leads, and the portions 8 of the contact members 6 may be split as indicated at 9 in Fig. 4 to ensure a tight engagement with the contacts of the external leads.

The contact members 6 are supported in the housing 1 by means of a pair of rigid plates 10 and 11 of insulating material. The lower plate 10 rests on a shoulder 12 encircling the opening 5 in the frame 4, and the upper plate 11 rests on the lower plate 10 and bears against an internal shoulder 13 in the housing 1, so that the two plates 10 and 11 are positioned between the shoulders 12 and 13 when the housing 1 is mounted on the frame 4. Each of the plates 10 and 11 has a plurality of holes 14 in it, corresponding in number and size to the contact members 6, and arranged to position the contact members in the desired relative positions. The holes in the two plates 10 and 11 coincide in position, and an annular recess or shoulder 15 is formed around each of the holes in the abutting sides of the plates 10 and 11.

The contact members 6 extend through the holes 14 of the insulating plates 10 and 11, and are held in fixed position with respect to the plates by means of spring rings 16, which are snapped into annular grooves 17 in each of the contact members and which engage the annular recesses 15 between the two plates 10 and 11, so that the contact members 6 are held against axial movement with respect to the plates 10 and 11. The plates 10 and 11 may be held from movement with respect to the housing 1 by means of notches 18 in the plates which engage a pin or key 19 in the housing 1. A block 20 of rubber, or other resilient material, is placed on top of the upper plate 11 in the housing 1, and has a plurality of holes 21 extending through it corresponding in number and position to the holes 14 of the plates 10 and 11, so that the contact members 6 extend through the holes 21 and are surrounded and supported by the rubber block 20. The parts so far described constitute the stationary or female portion of the separable connector.

The external leads are indicated at 22, and each of the leads 22 has a terminal contact member 23 secured to its end in any suitable manner, such as by soldering or brazing. The terminal members 23 are adapted to engage in the upper portions 8 of the terminal members 6 and have annular shoulders 24 around their upper ends. The leads 22 are surrounded and supported by a rubber block 25 which is generally similar to the block 20, although it may be of greater thickness, and which has holes 26 in it corresponding in number and position to the holes 21 of the block 20. A pressure plate 27 is placed on top of the rubber block 25 for the purpose of applying pressure to it. The plate 27 has holes 28 in it corresponding to the holes 26, but the holes 28 are made of greater diameter than the leads 22 which pass through the holes, so as to permit the rubber of the block 25 to flow upwardly around the leads when pressure is applied. The plate 27 is prevented from rotating with respect to the housing 1 by means of a lug 29 at one side of the plate which engages in a notch 30 at the top of the housing 1. Pressure is applied to the plate 27, and thus to the rubber block 25, by means of a nut 31 which has an internal annular flange or shoulder 32 engaging the plate 27, and which is internally threaded, as indicated at 33, to engage with corresponding threads 34 on the housing 1. The leads 22 and associated parts constitute the removable or male portion of the connector.

In the use of the separable connector shown in the drawing, the housing 1 is secured to the frame 4 of the device on which it is to be used with the plates 10 and 11 in position between the housing and frame supporting the contact members 6, and with the rubber block 20 in position surrounding the contact members 6 to which the internal leads are connected. This structure constitutes the stationary or female member of the separable connector, as previously stated. To connect the leads 22 to the internal leads of the device housed in the frame 4, the terminals 23 of the leads 22 are engaged in the upper portions 8 of the proper contact members 6. The rubber block 25 is then pushed down into the housing 1, and the pressure plate 27 is placed on top of the block 25 with its lug 29 engaging in the slot 30 in the housing 1. The nut 31 is then engaged with the housing 1, and screwed down tight to apply pressure to the plate 27, and thus to the block 25. Since rubber is relatively incompressible, but is capable of displacement, or flowing, in any direction under pressure, the effect of applying heavy pressure to the rubber block 25 is to cause it to flow around the leads 22 to grip and support them, and to apply a heavy radial pressure through the rubber block 20 to maintain the engaging contact surfaces of the contact members 23 and 6 in engagement. The block 25 firmly supports the leads 22, and since it flows upward in the openings 28 around the leads 22 in the manner shown in Fig. 1, it provides a gradually diminishing flexible support for the leads 22, which is a desirable type of lead take-off.

It will be apparent that with the construction described, a very desirable type of separable connector is provided for the type of service described, in which heavy currents are to be carried, and in which rapid and easy connection and disconnection are necessary. The connection is easily made as described above, and it will be obvious that disconnection is effected with equal ease merely by unscrewing the nut 31 to disengage it from the housing 1. The leads 22 may then readily be pulled out of the connector, the shoulders 24 on the contact members 23 carrying the rubber block 25 and associated parts with the leads.

It will be seen therefore that this connector has numerous advantages. Since pressure is applied to the engaging contact surfaces through the rubber blocks 25 and 20, these surfaces can be maintained under very heavy pressure, which is limited only by the force applied to the nut 31 in screwing it down on the housing 1. Thus, the contact surfaces are maintained in engagement under heavy pressure, and the construction is such that this pressure is not disturbed or diminished even when the connector is subjected to severe vibration. It will also be seen that the manner in which the leads leave the connector substantially prevents any possibility of chafing of the insulation, and that since the leads are surrounded by rubber there is no danger of grounding the leads if any damage to the insulation should occur in any manner.

The connector has the additional advantage that it can be entirely removed from the frame 4 without having to disconnect the contact members 6 from the internal leads. This is easily done after the external leads 22 and associated parts have been removed, as described above, by removing the mounting screws from the holes 3, which permits the housing 1 to be removed from the frame. With the housing 1, rubber block 20 and upper insulating plate 11 removed, the spring rings 16 can be disengaged from the contacts 6 so that the lower insulating plate 12 can be removed, and thus the entire connector can be removed from the frame 4 without having to break the connection of the contact members 6 to the internal leads.

It should now be apparent that a separable connector has been provided which is especially suitable for aircraft use and for handling heavy currents. A particular embodiment of the invention has been shown and described for the purpose of illustration, but it will be obvious that the invention is capable of various other modifications and embodiments, and it is to be understood therefore that the invention in its broadest aspects includes all equivalent embodiments

We claim as our invention:

1. An electrical connector comprising a housing, a pair of rigid plates of insulating material removably disposed in the housing and closing the bottom of the housing, said plates having a plurality of aligned holes therethrough, terminal contact members positioned in said holes and extending into the housing, means for retaining the contact members in fixed position relative to the plates, a resilient member removably disposed in the housing surrounding said contact members, a second resilient member in the housing above the first-mentioned resilient member, said second resilient member having openings therethrough aligned with the contact members for receiving electrical conductors to be engaged with the contact members, and means for applying pressure to the second resilient member to cause the resilient members to flow around the conductors and contact members to apply radial pressure to the engaging surfaces of the conductors and contact members, said second resilient member and pressure-applying means being removable from the housing with the conductors.

2. An electrical connector comprising a housing, a pair of rigid plates of insulating material removably disposed in the housing and closing the bottom of the housing, said plates having a plurality of aligned holes therethrough, terminal contact members positioned in said holes and extending into the housing, means for retaining the contact members in fixed position relative to the plates, a resilient member removably disposed in the housing surrounding said contact members, a second resilient member in the housing above the first-mentioned resilient member, said second resilient member having openings therethrough aligned with the contact members for receiving electrical conductors to be engaged with the contact members, a pressure plate on top of the second resilient member, said pressure plate having openings corresponding to the openings in the second resilient member but of larger diameter, and means for applying pressure to said pressure plate to cause the resilient members to flow around the conductors and contact members to apply radial pressure to the engaging surfaces of the conductors and contact members, said second resilient member, pressure plate and pressure-applying means being removable from the housing with the conductors.

3. An electrical connector comprising a housing, a terminal contact member in the housing, rigid insulating means in the housing for removably supporting said terminal contact member, a first member of resilient material removably disposed in the housing, said first resilient member having an opening therethrough for the terminal contact member, a second member of resilient material disposed in the housing adjacent the first resilient member, said second resilient member having an opening therethrough for a conductor to be engaged with the terminal contact member, and means for applying pressure to said resilient members to cause them to flow around the terminal contact member and the conductor to support the conductor and to apply radial pressure to the engaging surfaces of the terminal contact member and the conductor.

4. An electrical connector comprising a housing, a terminal contact member in the housing, rigid insulating means in the housing for removably supporting said terminal contact member, a first member of resilient material removably disposed in the housing, said first resilient member having an opening therethrough for the terminal contact member, a second member of resilient material disposed in the housing adjacent the first resilient member, said second resilient member having an opening therethrough for a conductor to be engaged with the terminal contact member, a pressure plate resting on the second resilient member, said pressure plate having an opening corresponding to the opening in the second resilient member but of larger diameter, and means for applying pressure to said pressure plate to cause the resilient members to flow around the terminal contact member and the conductor to support the conductor and to apply radial pressure to the engaging surfaces of the terminal contact member and the conductor, said second resilient member, pressure plate and pressure-applying means being removable from the housing with the conductor.

HARRY D. ELSE.
JOSEPH E. MULHEIM.

REFERENCES CITED

The following references are of record in the file of this patent:

UNITED STATES PATENTS

| Number | Name | Date |
|---|---|---|
| 1,686,534 | Rosenzweig | Oct. 9, 1928 |
| 2,176,718 | Linde | Oct. 17, 1939 |
| 2,177,509 | Abbott | Oct. 24, 1939 |
| 2,275,762 | Horton | Mar. 10, 1942 |
| 2,281,739 | Wright | May 5, 1942 |
| 2,337,618 | Miller | Dec. 28, 1943 |
| 2,344,192 | Wantz | Mar. 14, 1944 |
| 2,346,831 | Drury | Apr. 18, 1944 |
| 2,369,860 | Schroeder | Feb. 20, 1945 |
| 2,379,942 | Webber | July 10, 1945 |
| 2,404,682 | Baker | July 23, 1946 |